US011950307B2

(12) United States Patent
Wu et al.

(10) Patent No.: US 11,950,307 B2
(45) Date of Patent: *Apr. 2, 2024

(54) EFFICIENT HANDLING OF A RESOURCE CONTROL STATE CHANGE AND MULTI-NODE CONNECTIVITY

(71) Applicant: Google LLC, Mountain View, CA (US)

(72) Inventors: Chih-Hsiang Wu, Taoyuan (TW); Teming Chen, Taipei (TW)

(73) Assignee: Google LLC, Mountain View, CA (US)

( * ) Notice: Subject to any disclaimer, the term of this patent is extended or adjusted under 35 U.S.C. 154(b) by 454 days.

This patent is subject to a terminal disclaimer.

(21) Appl. No.: 17/288,434

(22) PCT Filed: Oct. 25, 2019

(86) PCT No.: PCT/US2019/058041
§ 371 (c)(1),
(2) Date: Apr. 23, 2021

(87) PCT Pub. No.: WO2020/086953
PCT Pub. Date: Apr. 30, 2020

(65) Prior Publication Data
US 2022/0015173 A1    Jan. 13, 2022

Related U.S. Application Data

(60) Provisional application No. 62/750,891, filed on Oct. 26, 2018.

(51) Int. Cl.
*H04W 76/16* (2018.01)
*H04W 76/19* (2018.01)
(Continued)

(52) U.S. Cl.
CPC .......... *H04W 76/16* (2018.02); *H04W 76/19* (2018.02); *H04W 76/27* (2018.02); *H04W 76/30* (2018.02)

(58) Field of Classification Search
CPC ..... H04W 76/16; H04W 76/19; H04W 76/27; H04W 76/30; H04W 76/15; H04W 76/34; H04W 76/20; H04W 74/0833
See application file for complete search history.

(56) References Cited

U.S. PATENT DOCUMENTS 10,313,934 B2   6/2019  Wu
11,336,517 B2   5/2022  Byun et al.
(Continued)

FOREIGN PATENT DOCUMENTS

CN    105814942    7/2016
CN    106538034    3/2017
(Continued)

OTHER PUBLICATIONS

"Notice of Allowance", U.S. Appl. No. 17/837,300, dated Jan. 31, 2023, 9 pages.
(Continued)

*Primary Examiner* — Will W Lin
(74) *Attorney, Agent, or Firm* — Colby Nipper PLLC

(57) ABSTRACT

This document describes techniques and devices for efficient handling of a resource control state change and multi-node connectivity. Instead of performing multiple radio resource control (RRC) procedures to change a resource control state of a user equipment (UE) and establish, modify, or release a connection with multi-node connectivity, the techniques described herein combine the multiple RRC procedures into a single RRC procedure that supports both a resource control state change and multi-node connectivity. In particular, a master node sends a resource control state and multi-node connectivity message that includes both state change information and multi-node connectivity information. With this single message, timing and power resources of the UE can be conserved and failures resulting from asynchronous com-
(Continued)

munication of the state change information and the multi-node connectivity information can be avoided.

20 Claims, 10 Drawing Sheets

(51) Int. Cl.
*H04W 76/27* (2018.01)
*H04W 76/30* (2018.01)

(56) References Cited

U.S. PATENT DOCUMENTS

| | | | |
|---|---|---|---|
| 11,751,268 | B2 | 9/2023 | Wu et al. |
| 2011/0158117 | A1 | 6/2011 | Ho et al. |
| 2015/0173047 | A1 | 6/2015 | Yamada |
| 2015/0195795 | A1 | 7/2015 | Loehr et al. |
| 2015/0215947 | A1 | 7/2015 | Kaukovuori et al. |
| 2015/0215965 | A1 | 7/2015 | Yamada et al. |
| 2016/0192433 | A1 | 6/2016 | Deenoo et al. |
| 2016/0219604 | A1* | 7/2016 | Fujishiro ............... H04W 36/30 |
| 2016/0323832 | A1 | 11/2016 | Love et al. |
| 2018/0160339 | A1 | 6/2018 | Wu |
| 2018/0270682 | A1 | 9/2018 | Zacharias et al. |
| 2019/0081657 | A1 | 3/2019 | Zeng et al. |
| 2019/0182883 | A1 | 6/2019 | He et al. |
| 2019/0387569 | A1* | 12/2019 | Martinez Tarradell ...................... H04W 76/27 |
| 2020/0037345 | A1* | 1/2020 | Ryoo ................... H04W 76/27 |
| 2020/0154442 | A1 | 5/2020 | Zhou |
| 2020/0205123 | A1 | 6/2020 | Byun et al. |
| 2020/0214073 | A1* | 7/2020 | Shimoda ............... H04W 16/32 |
| 2020/0245390 | A1 | 7/2020 | Ali et al. |
| 2020/0288338 | A1 | 9/2020 | Freda et al. |
| 2020/0374961 | A1* | 11/2020 | Ingale ................... H04W 76/20 |
| 2020/0413473 | A1* | 12/2020 | Susitaival ............. H04W 76/18 |
| 2021/0067409 | A1 | 3/2021 | Byun et al. |
| 2021/0084543 | A1* | 3/2021 | Wang ................... H04W 76/16 |
| 2021/0219193 | A1 | 7/2021 | Teyeb et al. |
| 2021/0274587 | A1* | 9/2021 | Jung ................ H04W 12/0433 |
| 2022/0287124 | A1 | 9/2022 | Ali et al. |
| 2022/0304091 | A1 | 9/2022 | Wu et al. |

FOREIGN PATENT DOCUMENTS

| | | |
|---|---|---|
| CN | 107925931 | 4/2018 |
| CN | 107959983 | 4/2018 |
| CN | 108076536 | 5/2018 |
| CN | 108633018 | 10/2018 |
| KR | 20150129293 | 11/2015 |
| WO | 2018029578 | 2/2018 |
| WO | 2018088840 | 5/2018 |
| WO | 2018130115 | 7/2018 |
| WO | 2018171512 | 9/2018 |
| WO | 2018172596 | 9/2018 |
| WO | 2018174791 | 9/2018 |
| WO | 2019027296 | 2/2019 |
| WO | 2019065634 | 4/2019 |
| WO | 2019099550 | 5/2019 |
| WO | 2020086953 | 4/2020 |

OTHER PUBLICATIONS

"Notice of Allowance", U.S. Appl. No. 17/837,300, dated May 15, 2023, 10 pages.
"CR for 36.331 on CA/DC Enhancements", 3GPP TSG-RAN WG2 Meeting #110-e, R2-2006349, Jun. 2020, 123 pages.
"CR for 38.331 for CA&DC enh", 3GPP TSG-RAN WG2 Meeting #109-e, R2-2002392, Feb. 2020, 112 pages.
"CR for 38.331 on CA/DC Enhancements", 3GPP TSG-RAN WG2 Meeting #110-e; R2-2006350, Jun. 2020, 106 pages.
"Evolved Universal Terrestrial Radio Access (E-UTRA) and NR", 3GPP TS 37.340 V15.3.0, Sep. 2018, 59 pages.
"Evolved Universal Terrestrial Radio Access Network (E-UTRAN)", 3GPP TR 36.875 V13.1.0, Sep. 2015, 37 pages.
"International Search Report and Written Opinion", PCT Application No. PCT/US2019/058041, dated Feb. 4, 2020, 18 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0, Jan. 2020, 137 pages.
"Radio Resource Control (RRC) protocol specification (Release 15", 3GPP TS 38.331 V15.12.0, Dec. 2020, 541 pages.
"RRC_INACTIVE with MR_DC", 3GPP TSG-RAN WG3 Meeting #99, Athens, Greece, Feb. 26-Mar. 2, 2018, 6 pages.
"Secondary Node Resume in NE-DC and NN-DC (TP to 38.300)", 3GPP TSG-RAN WG2 #103, Gothenburg, Sweden, Aug. 20-24, 2018, 6 pages.
"Secondary Node Resume in NE-DC and NR-DC", 3GPP TSG-RAN Meeting #103bis, Chengdu, China, Oct. 8, 2018 to Oct. 12, 2018, 5 pages.
"Secondary node resume in NE-DC and NR-DC", 3GPP TSG-RAN2 Meeting #103bis, R2-1814666, Oct. 2018, 5 pages.
"Study on Small Cell Enhancements for E-UTRA and E-UTRAN", 3GPP TR 36.842 V12.0.0, Dec. 2013, 71 pages.
Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
"Non-Final Office Action", U.S. Appl. No. 17/837,300, dated Sep. 21, 2022, 15 pages.
"ETSI TS 138 331 V15.3.0", 5G; NR; Radio Resource Control (RRC); Protocol specification (3GPP TS 38.331 version 15.3.0 Release 15), Oct. 2018, 441 pages.
"Foreign Office Action", EP Application No. 19802465.5, dated Nov. 29, 2021, 9 pages.
"Foreign Office Action", IN Application No. 202147018602, dated Feb. 10, 2022, 5 pages.
"RRC_INACTIVE with MR_DC", 3GPP TSG-RAN WG3 Meeting #99—R3-181087, Mar. 2018, 6 pages.
"International Preliminary Report on Patentability", Application No. PCT/US2019/058041, dated Apr. 27, 2021, 11 pages.
"Foreign Office Action", CN Application No. 201980066747.8, dated Sep. 29, 2023, 21 pages.
"Foreign Office Action", EP Application No. 19802465.5, dated Oct. 19, 2023, 10 pages.

* cited by examiner

EFFICIENT HANDLING OF A RESOURCE CONTROL STATE CHANGE AND MULTI-NODE CONNECTIVITY

RELATED APPLICATION(S)

This application is a national stage entry of International Application No. PCT/US2019/058041, filed Oct. 25, 2019, which claims the benefit of U.S. Provisional Application No. 62/750,891, filed Oct. 26, 2018, the disclosures which are incorporated herein by reference in their entirety.

BACKGROUND

The evolution of wireless communication to 5th-generation (5G) standards and technologies provide higher data rates and greater capacity, with improved reliability and lower latency, which enhances mobile broadband services. 5G technologies also provide new classes of services for vehicular, fixed wireless broadband, and the Internet of Things (IoT). The specification of the features in the 5G air interface is defined as 5G New Radio (5G NR).

To communicate wirelessly with a network, a user equipment (UE) may establish a connection to the network using at least one node (e.g., a base station or a serving cell) that supports a 5th-generation core network (5GC). In some situations, the UE can use multi-node connectivity (e.g., dual connectivity) to connect to multiple nodes at a time. By connecting to multiple nodes, performance improvements in user throughput, mobility robustness, or load balancing can be realized. The multiple nodes can be associated with a same radio access technology (RAT) or different RATs. As an example, the UE can use multi-RAT dual connectivity (MR-DC) or new-radio dual-connectivity (NR-DC) to establish communication with two nodes (e.g., a master node (MN) and a secondary node (SN)).

Current techniques execute multiple radio resource control (RRC) procedures to change a resource control state of the UE and re-establish, modify, or release a connection with multi-node connectivity. For example, current techniques can execute, at different times, an RRC connection resume procedure to change a resource control state of the UE and an RRC reconfiguration procedure to establish a connection with multi-node connectivity. Each of the multiple RRC procedures can direct the UE to transmit or receive.

The execution of multiple RRC procedures, however, can be inefficient and can result in communication delays on the order of seconds. Furthermore, the sequential execution of multiple RRC procedures provides an opportunity for a failure to occur during a time period between the multiple RRC procedures. For example, a failure can occur if a secondary cell group (SCG) configuration stored by the UE is not valid for a new SN that the MN selected for establishing a connection with multi-node connectivity. Another example failure can occur if the UE attempts to communicate with an SN previously used for multi-node connectivity after selecting a new MN that is unable to support multi-node connectivity with the SN. Both the additional transmissions performed for executing the multiple RRC procedures and for reporting failures can waste power or timing resources of the UE.

SUMMARY

Techniques and apparatuses are described for efficient handling of a resource control state change and multi-node connectivity. Instead of performing multiple radio resource control (RRC) procedures to change a resource control state of a user equipment (UE) and establish, modify, or release a connection with multi-node connectivity, the techniques described herein combine the multiple RRC procedures into a single RRC procedure that supports both a resource control state change and multi-node connectivity. In particular, a master node (MN) sends a resource control state and multi-node connectivity message to the UE that includes both state change information and multi-node connectivity information. This single message can direct the UE to transition to a different resource control state and direct the UE to perform an operation for multi-node connectivity. For example, the state change information can direct the UE to transition between a connected state and an inactive state while the multi-node connectivity information can direct the UE to reconnect with multi-node connectivity, connect without multi-node connectivity, release a connection with multi-node connectivity, connect with multi-node connectivity to a different SN, or connect with multi-node connectivity to a different MN and a different SN.

The resource control state and multi-node connectivity message can include information from multiple messages, such as from a resource control state message (e.g., an RRC connection release message with a suspend information element (IE) or an RRC connection resume message) and an RRC reconfiguration message, which current techniques send at different times for different RRC procedures. By concurrently sending information from these messages together in the resource control state and multi-node connectivity message, timing and power resources of the UE can be conserved, and failures resulting from asynchronous communication of this information can be avoided.

Aspects described below include a method performed by a base station for efficient handling of a resource control state change and multi-node connectivity. The method includes the base station operating as a master node (MN) for multi-node connectivity with a user equipment (UE) and a secondary node (SN). The method also includes the base station sending a first resource control state and multi-node connectivity message to the UE. The first resource control state and multi-node connectivity message includes state change information and multi-node connectivity information. The state change information directs the UE to transition from a first resource control state to a second resource control state. The multi-node connectivity information includes at least one secondary cell group configuration to direct the user equipment to modify a previously-stored secondary cell group configuration based on the at least one secondary cell group configuration.

Aspects described below include a base station comprising a radio-frequency transceiver. The base station also includes a processor and memory system configured to perform the method of any of the methods described.

Aspects described below include a method performed by a user equipment (UE) for efficient handling of a resource control state change and multi-node connectivity. The method includes the user equipment connecting with multi-node connectivity to a master node (MN) and a secondary node (SN). The method also includes the user equipment receiving a first resource control state and multi-node connectivity message, which includes state change information and multi-node connectivity information. The multi-node connectivity information includes at least one secondary cell group configuration. Based on the state change information, the method additionally includes the user equipment transitioning from a first resource control state to a second resource control state. The method further includes the user equipment modifying a previously-stored secondary cell group configuration based on the at least one secondary cell group configuration.

Aspects described below include a user equipment comprising a radio-frequency transceiver. The user equipment also includes a processor and memory system configured to perform any of the methods described.

Aspects described below also include a system with means for efficiently handling a resource control state change and multi-node connectivity by communicating a resource control state and multi-node connectivity message that includes state change information and multi-node connectivity information.

BRIEF DESCRIPTION OF THE DRAWINGS

Apparatuses of and techniques for efficient handling of a resource control state change and multi-node connectivity are described with reference to the following drawings. The same numbers are used throughout the drawings to reference like features and components.

DETAILED DESCRIPTION

Overview

Techniques and apparatuses are described for efficient handling of a resource control state change and multi-node connectivity. Instead of performing multiple radio resource control (RRC) procedures to change a resource control state of a user equipment (UE) and establish, modify, or release a connection with multi-node connectivity, the techniques described herein combine the multiple RRC procedures into a single RRC procedure that supports both a resource control state change and multi-node connectivity. In particular, a master node (MN) sends a resource control state and multi-node connectivity message to the UE that includes both state change information and multi-node connectivity information. This single message can direct the UE to transition to a different resource control state and direct the UE to perform an operation for multi-node connectivity. For example, the state change information can direct the UE to transition between a connected state and an inactive state while the multi-node connectivity information can direct the UE to reconnect with multi-node connectivity, connect without multi-node connectivity, release a connection with multi-node connectivity, connect with multi-node connectivity to a different SN, or connect with multi-node connectivity to a different MN and a different SN.

The resource control state and multi-node connectivity message can include information from multiple messages, such as from a resource control state message (e.g., an RRC connection release message with a suspend information element (IE) or an RRC connection resume message) and an RRC reconfiguration message, which current techniques send at different times for different RRC procedures. By concurrently sending information from these messages together in the resource control state and multi-node connectivity message, timing and power resources of the UE can be conserved, and failures resulting from asynchronous communication of the information can be avoided.

Example Environment

Figure 1:
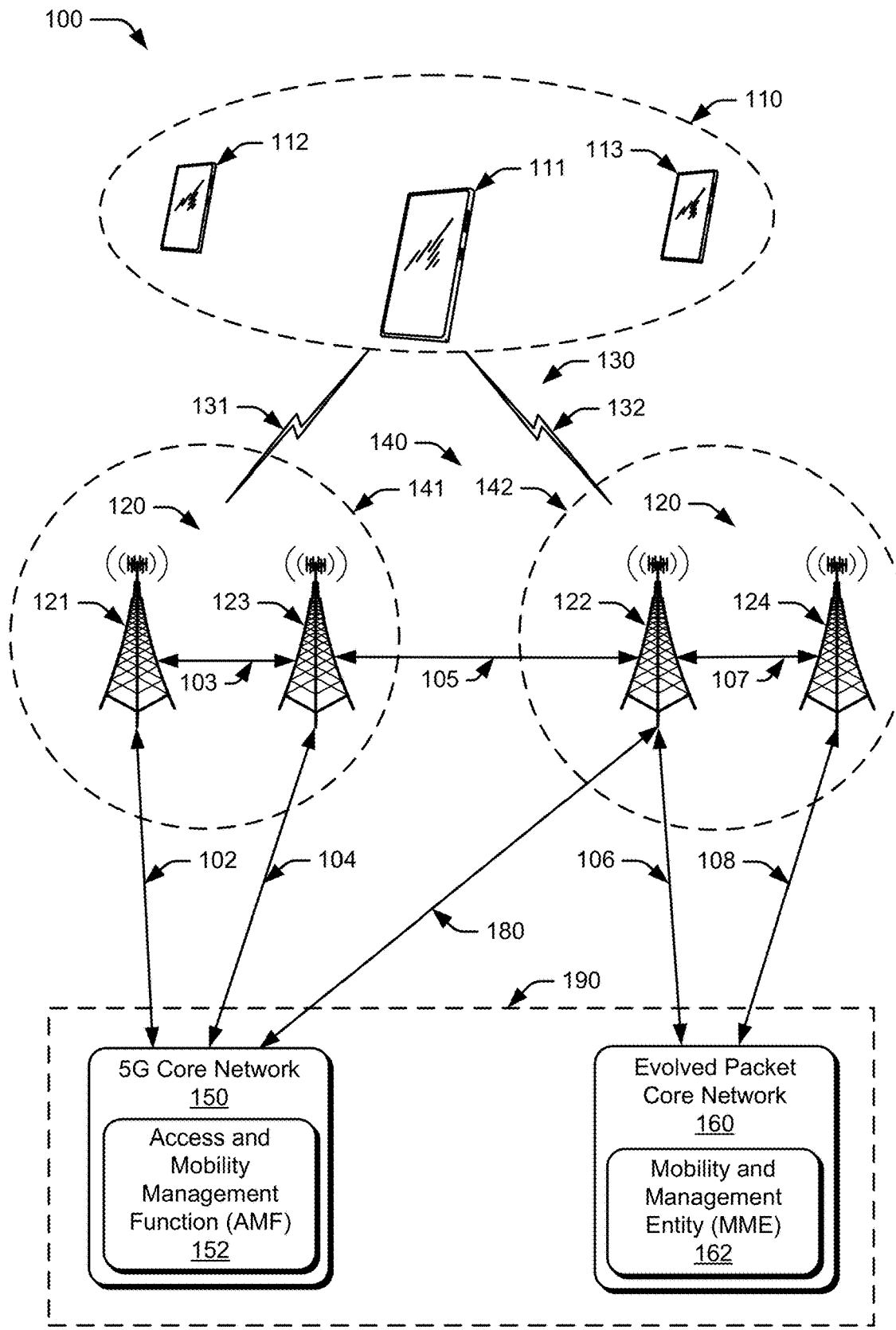
FIG. 1 illustrates an example wireless network environment in which efficient handling of a resource control state change and multi-node connectivity can be implemented.

FIG. 1 illustrates an example environment 100, which includes multiple user equipment 110 (UE 110), illustrated as UE 111, UE 112, and UE 113. Each UE 110 can communicate with base stations 120 (illustrated as base stations 121, 122, 123, and 124) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Evolved Node B, ng-eNB, Next Generation Node B, gNode B, gNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd-Generation Partnership Project Long-Term Evolution (3GPP LTE), Enhanced Long-Term Evolution (eLTE), 5th-Generation New Radio (5G NR), 4th-Generation (4G) standard, and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. In FIG. 1, core networks 190 are shown to include a Fifth-Generation Core (5GC) network 150 (5GC 150) and an Evolved Packet Core (EPC) network 160 (EPC 160), which are different types of core networks. The base stations 121 and 123 in the NR RAN 141 are connected to the 5GC 150. The base stations 122 and 124 in the E-UTRAN 142 are connected to the EPC 160. Optionally or additionally, the base station 122 may connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an Si interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks 190, the base stations 120 may communicate with each other. For example, the base stations 121 and 123 communicate through an Xn interface at 103, the base stations 122 and 123 communicate through an Xn interface at 105, and the base stations 122 and 124 communicate through an X2 interface at 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

The UE 110 can use multi-node connectivity to connect to multiple nodes (e.g., at least two base stations or serving cells) at a time. Different types of multi-node connectivity can include multi-RAT dual connectivity (MR-DC) or new-radio dual connectivity (NR-DC). With the MR-DC, the UE 110 can connect to the 5GC via the base stations 121 and 122, either of which can operate as the MN or the SN. With the NR-DC, the UE 110 can connect to the 5GC via the base stations 121 and 123. With multi-node connectivity, performance improvements in user throughput, mobility robustness, or load balancing can be realized. To avoid wasting UE resources or delaying communications, however, both the UE 110 and the base station 120 respectively include resource control modules that can jointly execute a single procedure that supports a resource control state change and multi-node connectivity, as described in FIG. 2.

Example Devices

Figure 2:
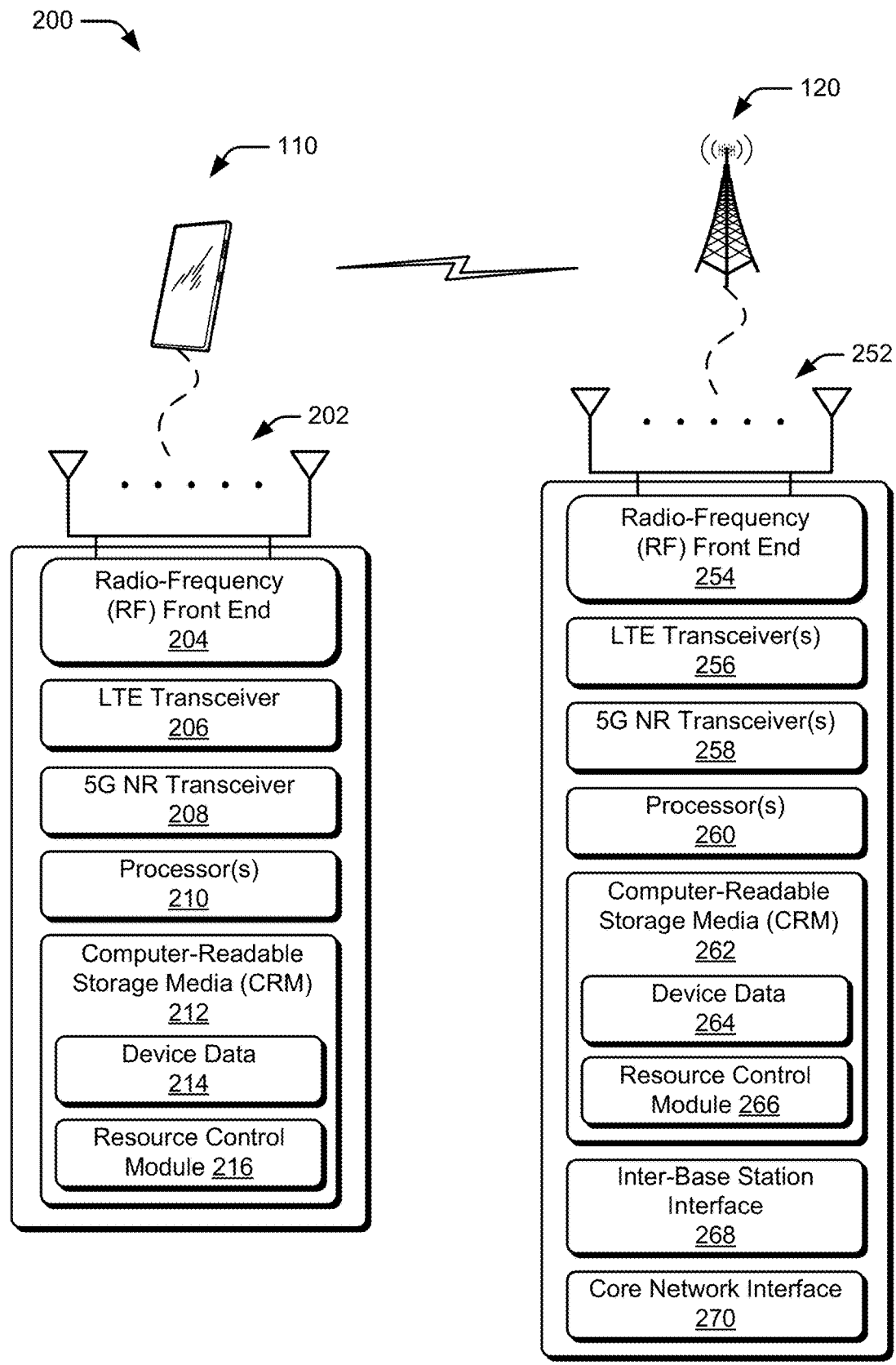
FIG. 2 illustrates an example device diagram of a user equipment and a base station for efficient handling of a resource control state change and multi-node connectivity.

FIG. 2 illustrates an example device diagram 200 of the UE 110 and the base station 120 for efficient handling of a resource control state change and multi-node connectivity. The UE 110 and the base station 120 may include additional functions and interfaces that are omitted from FIG. 2 for the sake of clarity. The UE 110 includes antennas 202, a radio-frequency (RF) front end 204 (RF front end 204), a radio-frequency transceiver, such as an LTE transceiver 206, and/or a 5G NR transceiver 208, for communicating with base stations 120 in the 5G RAN 141 and/or the E-UTRAN 142. The RF front end 204 of the UE 110 can couple or connect the LTE transceiver 206 and the 5G NR transceiver 208 to the antennas 202 to facilitate various types of wireless communication. The antennas 202 of the UE 110 may include an array of multiple antennas that are configured similar to or different from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208.

The UE 110 also includes processor(s) 210 and computer-readable storage media 212 (CRM 212). The processor 210 may be a single-core processor or a multi-core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beam-forming codebooks, applications, and/or an operating system of the UE 110, which are executable by processor(s) 210 to enable user-plane communication, control-plane signaling, and user interaction with the UE 110.

The CRM 212 also includes a resource control module 216. Alternatively or additionally, the resource control module 216 may be implemented in whole or part as hardware logic or circuitry integrated with or separate from other components of the UE 110. The resource control module 216 can implement a radio resource control (RRC) layer, as described according to the wireless communication standard. The resource control module 216 controls a resource control state of the UE 110 and directs the UE 110 to perform operations according to the resource control state. Example resource control states include a connected state (e.g., an RRC connected state), an inactive state (e.g., an RRC inactive state), or an idle state (e.g., an RRC idle state). In general, if the UE 110 is in the connected state, the connection with the base station 120 is active. In the inactive state, the connection with the base station 120 is suspended. If the UE 110 is in the idle state, the connection with the base station 120 is released.

The resource control module 216 can also manage information for multi-node connectivity. For example, the resource control module 216 can store, update, or release one or more master cell group (MCG) configurations or secondary cell group (SCG) configurations used for multi-node connectivity. In general, the UE 110 uses the MCG configuration to communicate with the MN and uses the SCG configuration to communicate with the SN. Different types of MCG or SCG configurations can include a physical layer configuration, a medium access control (MAC) configuration, a radio link control (RLC) configuration, a packet data convergence protocol (PDCP) configuration, a radio bearer configuration, a random access configuration, and so forth.

In at least some aspects, the resource control module 216 configures the LTE transceiver 206 or the 5G NR transceiver 208 for communication with the base station 120. In this way, the resource control module 216 can receive a resource control state and multi-node connectivity message, as further described with respect to FIG. 3.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The base station 120 includes antennas 252, a radio-frequency (RF) front end 254 (RF front end 254), one or more radio-frequency transceivers, such as one or more LTE transceivers 256, and/or one or more 5G NR transceivers 258, for communicating with the UE 110. The RF front end 254 of the base station 120 can couple or connect the LTE transceivers 256 and the 5G NR transceivers 258 to the antennas 252 to facilitate various types of wireless communication. The antennas 252 of the base station 120 may include an array of multiple antennas that are configured similar to or different from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base station 120 also includes processor(s) 260 and computer-readable storage media 262 (CRM 262). The processor 260 may be a single-core processor or a multi-core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base station 120. The device data 264 includes network scheduling data, radio resource management data, beamforming codebooks, applications, and/or an operating system of the base station 120, which are executable by the processor 260 to enable communication with the UE 110.

The CRM 262 also includes a resource control module 266. Alternatively or additionally, the resource control module 266 may be implemented in whole or part as hardware logic or circuitry integrated with or separate from other components of the base station 120. In at least some aspects, the resource control module 266 configures the LTE transceivers 256 and the 5G NR transceivers 258 for communication with the UE 110, as well as communication with the core network 190. In particular, the resource control module 266 can send the resource control state and multi-node connectivity message to the UE 110, as further described with respect to FIG. 3. In this manner, the resource control module 266 of the base station 120 can communicate with the resource control module 216 of the UE 110 such that the resource control modules 216 and 266 jointly execute a single procedure that supports both a resource control state change and multi-node connectivity. The resource control module 266 can also manage information for multi-node connectivity by storing or updating MCG and SCG configurations used for multi-node connectivity.

The base station 120 includes an inter-base station interface 268, such as an Xn and/or X2 interface, to exchange user-plane and control-plane data with another base station 120. The base station 120 also includes a core network interface 270 to exchange information with core network functions and entities.

The resource control module 216 of the UE 110 and the resource control module 266 of the base station 120 can at least partially implement efficient handling of a resource control state change and multi-node connectivity as described herein. FIGS. 3-9 further illustrate example data and control transactions that can be performed by the resource control modules 216 and 266.

Figure 3:
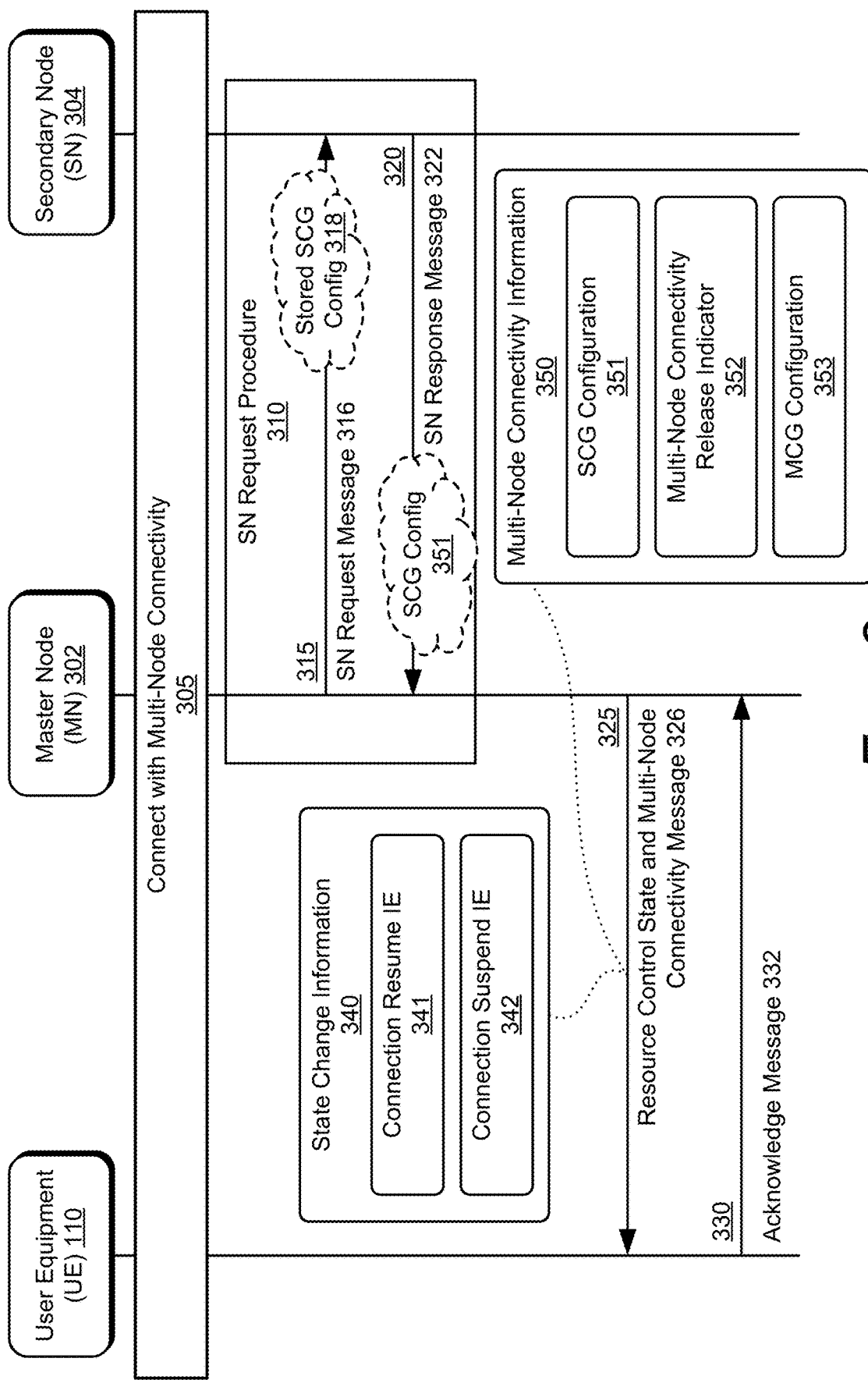
FIG. 3 illustrates details of example data and control transactions between entities for efficient handling of a resource control state change and multi-node connectivity.

Efficient Handling of a Resource Control State Change and Multi-Node Connectivity FIG. 3 illustrates details of example data and control transactions between entities for efficient handling of a resource control state change and multi-node connectivity. In this example, the UE 110 connects with multi-node connectivity to a master node (MN) 302 (e.g., the base station 121) and at least one secondary node (SN) 304 (e.g., the base station 122 or 123). For example, the UE 110 can connect with dual-connectivity (e.g., MR-DC or NR-DC) to the MN 302 and the SN 304. To establish a connection with multi-node connectivity, the MN 302 can transmit an SN addition request message (not shown) to the SN 304, and the SN 304 can respond with an SN addition request acknowledge message (not shown). The SN addition request acknowledge message can include one or more SCG configurations that enable the UE 110 to communicate with the SN 304. The MN 302 can forward the UE 110 the SCG configuration in a reconfiguration message (e.g., an RRC reconfiguration message or an RRC connection reconfiguration message) (not shown). Both the UE 110 and the MN 302 can store the SCG configuration that is provided indirectly or directly by the SN 304.

At 305, the UE 110 connects with multi-node connectivity to the MN 302 and the SN 304. Through this connection, the UE 110 can communicate directly with the MN 302 and can communicate directly or indirectly with the SN 304. For instance, the UE 110, the MN 302, or the SN 304 can communicate RRC messages or application data with each other. A variety of different types of data and control transactions can occur while the connection with multi-node connectivity is active, examples of which are further described with respect to FIG. 4.

In some situations, the MN 302 and the SN 304 perform an SN request procedure 310. During the SN request procedure 310, the MN 302 sends an SN request message 316 (e.g., an SN modification request message or an SN addition request message) to the SN 304, as shown at 315. In some situations, the SN request message 316 can include a stored SCG configuration 318, which the SN 304 previously provided to the MN 302. The stored SCG configuration 318 is a full SCG configuration, which includes a complete set of information elements (IEs) to enable a UE 110 to communicate with the SN 304. Optionally, the SN request message 316 can include an IE to direct the SN 304 to send a delta SCG configuration based on the stored SCG configuration 318. The delta SCG configuration includes one or more IEs of an SCG configuration that are new or are changed with respect to the previously stored SCG configuration 318. In other situations, the SN request message 316 does not include the stored SCG configuration 318 to direct the SN 304 to respond to the request with a full SCG configuration (see below). The stored SCG configuration 318 may not be included in the SN request message 316 if, for example, the SN 304 did not previously send the MN 302 an SCG configuration.

At 320, the SN 304 sends an SN response message 322 (e.g., an SN addition request acknowledge message or an SN modification request acknowledge message) to the MN 302. Depending on the situation, the SN response message 322 may or may not include an SCG configuration 351, which can be a delta SCG configuration or a full SCG configuration. In some cases, the SN 304 can determine to send the full SCG configuration if the SN request message 316 does not include the stored SCG configuration 318. In other cases, the SN 304 can determine to send the delta SCG configuration if the SN request message 316 includes the stored SCG configuration 318 or if the SN request message 316 includes the IE that forces the SN 304 to send the delta SCG configuration. In still other cases, the SN 304 can ignore the stored SCG configuration 318 provided by the SN request message 316 and send the full SCG configuration as the SCG configuration 351.

Sometimes the SN 304 may reject the SN request message 316 or be unable to provide the SCG configuration 351. In this situation, the SN 304 may not respond to the SN request message 316 in a given time period or instead respond with a SN response message 322 containing a rejection element, in which case the MN 302 can use the resource control state and multi-node connectivity message 326 to release the connection with multi-node connectivity, as further described with respect to FIG. 5.

At 325, the MN 302 sends a resource control state and multi-node connectivity message 326 to the UE 110. Different situations can cause the resource control state and multi-node connectivity message 326 to be sent while the connection with multi-node connectivity is active or suspended. The resource control state and multi-node connectivity message 326 includes both state change information 340 and multi-node connectivity information 350.

The state change information 340 directs the UE 110 to transition from a current resource control state to a different resource control state. For example, the state change information 340 can include a connection resume IE 341 (e.g., connection resume information) that directs the UE 110 to transition from the inactive state to the connected state. As another example, the state change information 340 can include a connection suspend IE 342 (e.g., connection suspend information) that directs the UE 110 to transition from the connected state to the inactive state.

The multi-node connectivity information 350 can include at least one SCG configuration 351 or a multi-node connectivity release indicator 352. The SCG configuration 351 can be a delta SCG configuration or a full SCG configuration. Use of the delta SCG configuration can reduce a size of the resource control state and multi-node connectivity message 326 relative to use of the full SCG configuration. The multi-node connectivity information 350 can also include an indicator that directs the UE 110 to modify or replace a previously-stored SCG configuration with the SCG configuration 351 provided by the resource control state and multi-node connectivity message 326.

The multi-node connectivity release indicator 352 can direct the UE 110 to release a previously-stored SCG configuration associated with the SN 304. In this manner, the connection with multi-node connectivity at 305 can be released. In some cases, the multi-node connectivity information 350 can include at least one MCG configuration 353, which can be a delta MCG configuration or a full MCG configuration similar to the SCG configuration 351.

At 330, the UE 110 can send an acknowledge message 332 in response to receiving the resource control state and multi-node connectivity message 326. In FIGS. 4-9, the resource control state and multi-node connectivity message 326 is transmitted to concurrently communicate the state change information 340 and the multi-node connectivity information 350.

Figure 4:
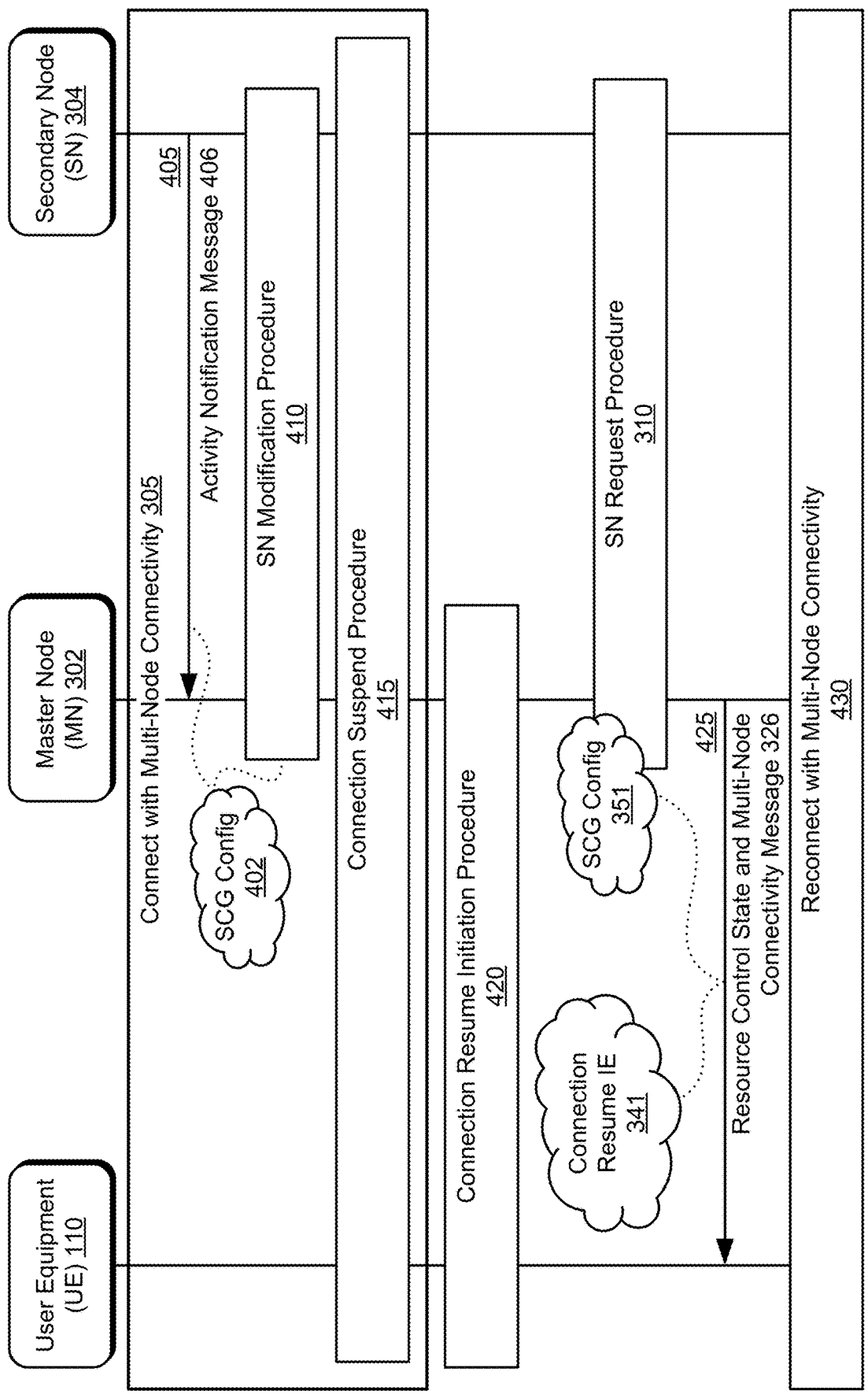
FIG. 4 illustrates details of example data and control transactions between entities for efficient handling of a resource control state change and multi-node connectivity to reconnect with multi-node connectivity.

FIG. 4 illustrates details of example data and control transactions between entities for efficient handling of a resource control state change and multi-node connectivity to reconnect with multi-node connectivity. As described above with respect to FIG. 3, the UE 110 connects with multi-node connectivity to the MN 302 and the SN 304 at 305. In some cases, an SCG configuration 402 can be provided by the SN 304 to the MN 302 by an activity notification message 406 or by an SN modification procedure 410 while the connection with multi-node connectivity is active. With the SCG configuration 402, the MN 302 can add or update the stored SCG configuration 318.

At 405, for instance, the SN 304 sends the activity notification message 406 with the SCG configuration 402. The activity notification message 406 can also be used by the SN 304 to inform the MN 302 of data inactivity between the SN 304 and the UE 110. The data inactivity represents a situation in which the SN 304 does not receive a request from the UE 110 to transmit or receive data. This can cause the MN 302 to perform a connection suspend procedure 415, which is further described below.

During the SN modification procedure 410, the MN 302 can send an SN modification request message (not shown) to the SN 304 to direct the SN 304 to provide the SCG configuration 402. The SN 304 can include the SCG configuration 402 in an SN modification request acknowledge message (not shown), which is sent to the MN 302. In some cases, however, the SN 304 may instead respond with an SN modification request acknowledge message that does not include the SCG configuration 402. Sometimes this SN modification request acknowledge message can contain a rejection element to indicate to the MN 302 that the SN 304 is unable to provide the SCG configuration 402.

While the connection with multi-node connectivity is active, the SN 304 can decide to add or modify the SCG configuration 402. To direct the UE 110 to use this new SCG configuration, the SN 304 can initiate execution of an SCG reconfiguration procedure (not shown) with the UE 110. During the SCG reconfiguration procedure, the SN 304 can send a reconfiguration message (e.g., an RRC reconfiguration message or an RRC connection reconfiguration message) to the UE 110 with the SCG configuration. In response to receiving the reconfiguration message, the UE 110 can store the SCG configuration and send an SCG reconfiguration complete message (e.g., an RRC reconfiguration complete message or an RRC connection reconfiguration complete message) to the SN 304. The SCG reconfiguration complete message can notify the SN 304 that the UE 110 can use the SCG configuration for future communications using multi-node connectivity.

While the connection with multi-node connectivity is active, a connection suspend procedure 415 is jointly executed by the UE 110, the MN 302, and the SN 304. The connection suspend procedure 415 suspends the connection with multi-node connectivity and directs the UE 110 to transition from the connected state to the inactive state. The connection suspend procedure 415 can be performed in response to a determination by the MN 302 to suspend communications or in response to the SN 304 sending the MN 302 the activity notification message 406 to inform the MN 302 of data inactivity between the SN 304 and the UE 110. During the connection suspend procedure 415, the MN 302 can perform the SN modification procedure 410 to release lower layers of the SN 304 or release an SCG configuration stored by the SN 304. The MN 302 can also send a connection suspend message (e.g., an RRC release message with a SuspendConfig IE or an RRC connection release message with an InactiveConfig IE) to the UE 110 to direct the UE 110 to transition from the connected state to the inactive state.

In general, the inactive state enables the UE 110 to conserve power and maintain information to efficiently re-connect to the core network 190. While in the inactive state, the UE 110 can continue to store the one or more MCG configurations and one or more SCG configurations associated with the multi-node connectivity at 305. By storing these configurations, the UE 110 can readily reconnect with multi-node connectivity to the MN 302 and the SN 304. The UE 110 can also perform some operations, such as a cell re-selection procedure, while in the inactive state. In some situations, the cell-reselection procedure can direct the UE 110 to connect to a different MN, as further described with respect to FIGS. 8 and 9.

Figure 8:
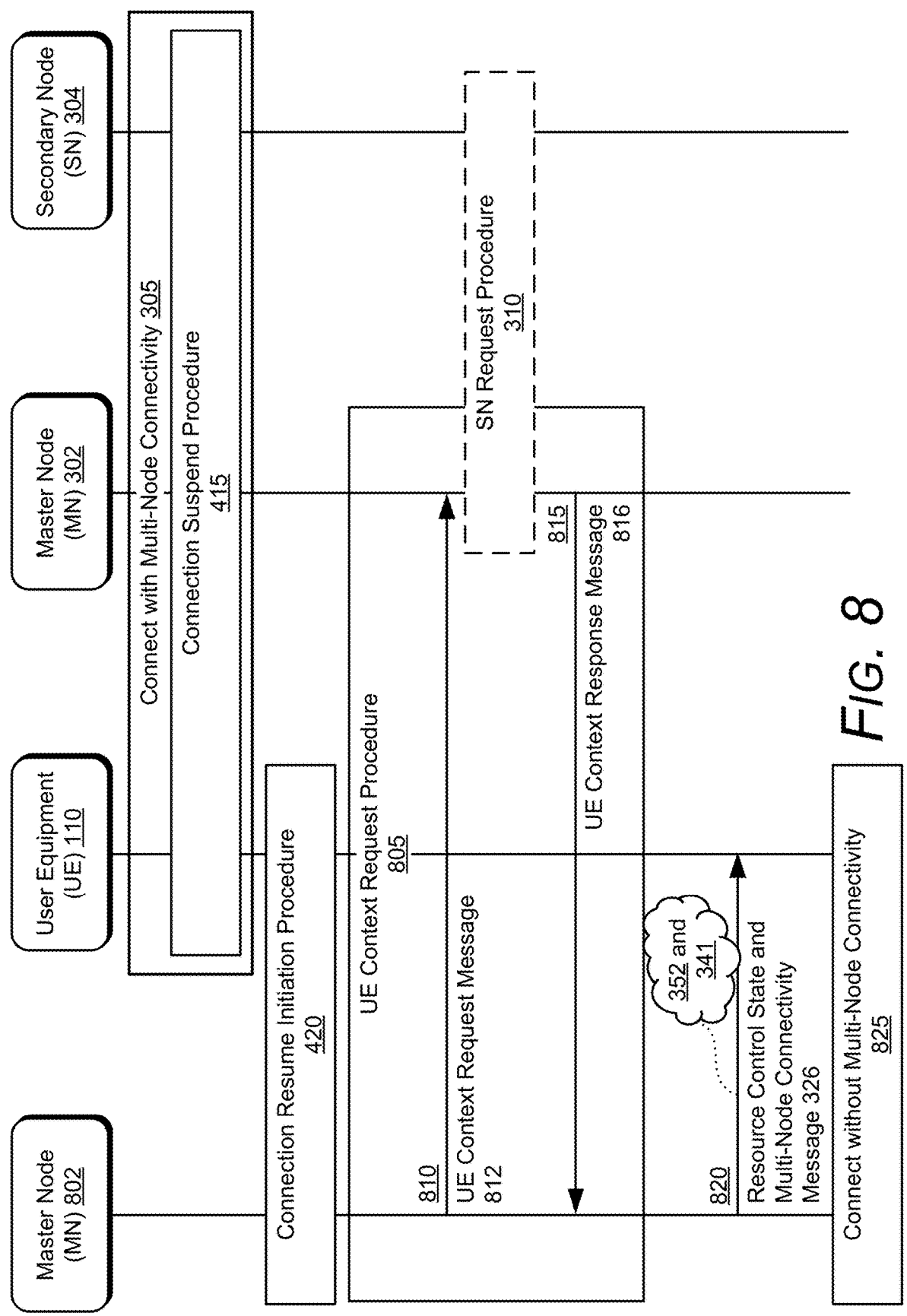
FIG. 8 illustrates details of example data and control transactions between entities for efficient handling of a resource control state change and multi-node connectivity to connect without multi-node connectivity to a different MN.
Figure 9:
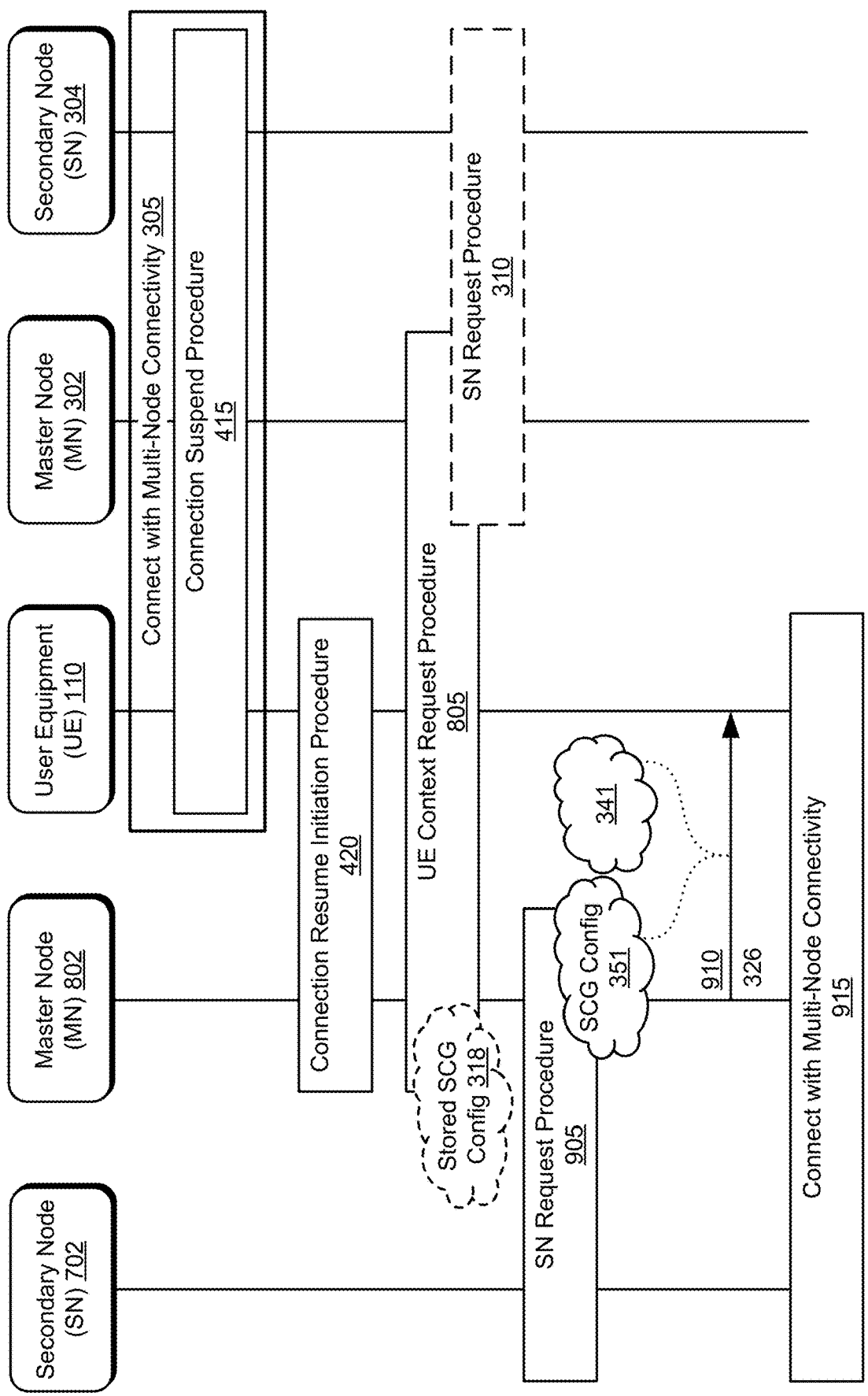
FIG. 9 illustrates details of example data and control transactions between entities for efficient handling of a resource control state change and multi-node connectivity to connect with multi-node connectivity to a different MN and a different SN.

While the UE 110 is in the inactive state, a connection resume initiation procedure 420 can be performed between the UE 110 and the MN 302. In general, the connection resume initiation procedure 420 triggers the UE 110 and the MN 302 (or another MN as shown in FIGS. 8 and 9) to establish connectivity. In other words, the connection resume initiation procedure 420 can include a beginning set of data and control transactions that are considered part of a connection resume procedure that results in the UE 110 transitioning to the connected state.

The connection resume initiation procedure 420 can be performed in response to a determination by the MN 302 to re-establish communications with the UE 110. Sometimes this determination is based on the SN 304 sending a second activity notification message to the MN 302 to indicate data activity. Other times this determination is based on the MN 302 receiving a connection resume request message (e.g., an RRC resume request message or an RRC connection resume request message) from the UE 110. The second activity notification message or the connection resume request message can include a request to establish the connection with multi-node connectivity. Prior to sending the connection resume request message, the UE 110 and the MN 302 can perform a random access procedure as part of the connection resume initiation procedure 420 to enable the UE 110 to use an uplink grant configured by the random access procedure to send the connection resume request message.

In response to the connection resume initiation procedure 420 or as part of the connection resume procedure, the MN 302 and the SN 304 can perform the SN request procedure 310, as described with respect to FIG. 3. In this case, the MN 302 receives the SCG configuration 351 from the SN 304 during the SN request procedure 310. The SCG configuration 351 can be a most-recent SCG configuration that was used while the connection with multi-node connectivity was active at 305. In some cases, the MN 302 may not have prior knowledge of the SCG configuration 351. This can occur if the SN 304 communicated the SCG configuration 351 directly with the UE 110 (e.g., using a dedicated signaling radio bearer (SRB). Therefore the SN request procedure 310 enables the MN 302 to obtain the SCG configuration 351.

At 425, the MN 302 sends the resource control state and multi-node connectivity message 326 with the SCG configuration 351 and a connection resume IE 341 to the UE 110, as described with respect to FIG. 3. In this example scenario, the SCG configuration 351 and the connection resume IE 341 are respective forms of the multi-node connectivity information 350 and the state change information 340 of FIG. 3. Using the SCG configuration 351, the UE 110 can reconnect with multi-node connectivity with the MN 302 and the SN 304, as shown at 430. In some situations, the SCG configuration 351 can include a random access configuration (not shown). With the random access configuration, the UE 110 can perform a random access procedure with the SN 304 to re-establish the connection with the SN 304. In general, execution of the SN request procedure 310 and transmission of the resource control state and multi-node connectivity message 326 enable the multi-node connection at 305 to be re-established between the UE 110, the MN 302, and the SN 304.

Figure 5:
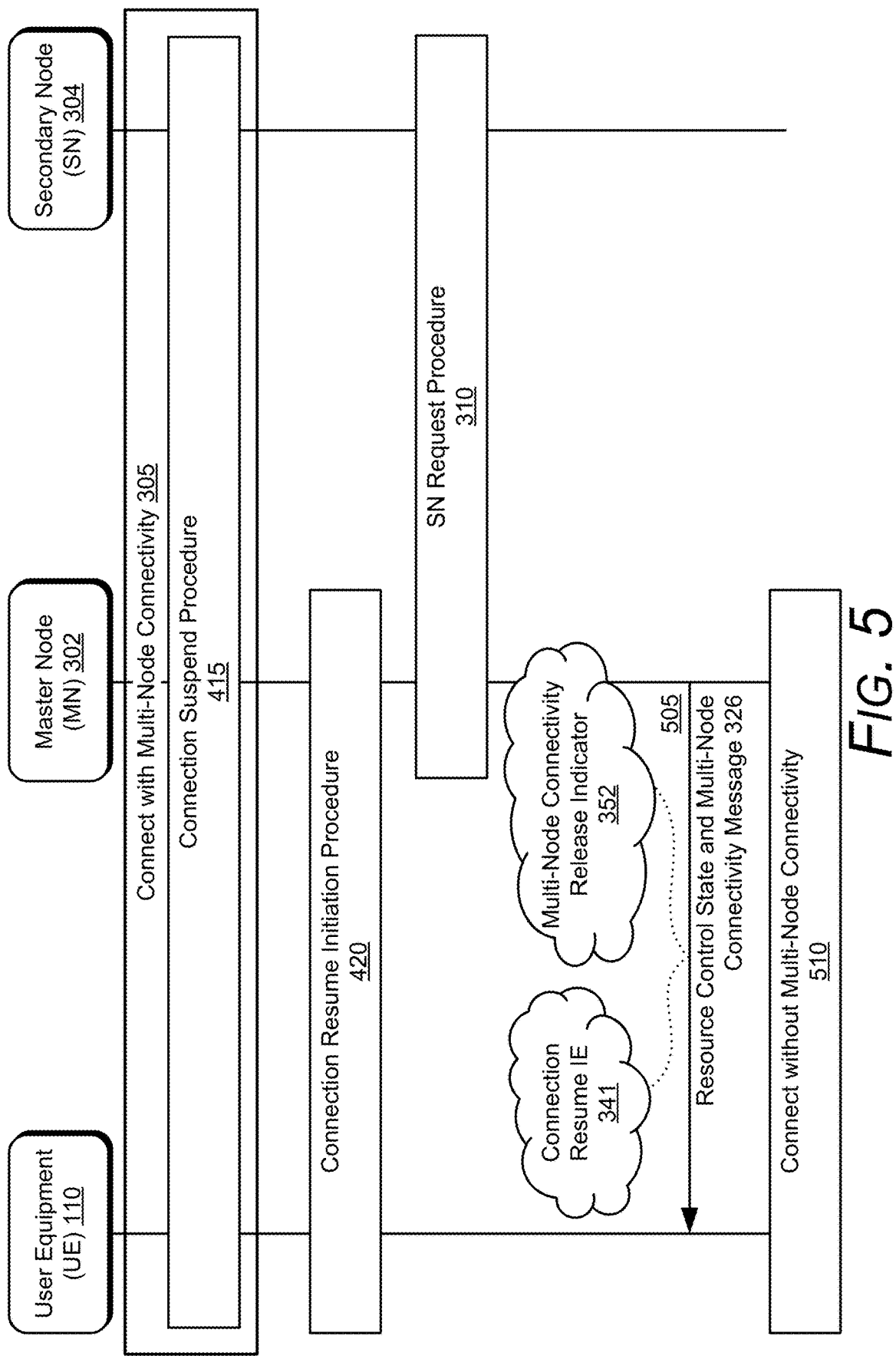
FIG. 5 illustrates details of example data and control transactions between entities for efficient handling of a resource control state change and multi-node connectivity to connect without multi-node connectivity.

FIG. 5 illustrates details of example data and control transactions between entities for efficient handling of a resource control state change and multi-node connectivity to connect without multi-node connectivity. Similar to FIG. 4, the UE 110 connects with multi-node connectivity to the MN 302 and the SN 304. The connection suspend procedure 415, the connection resume initiation procedure 420, and the SN request procedure 310 can also be performed as described above.

In contrast to FIG. 4, however, the SN 304 in FIG. 5 does not send the MN 302 the SCG configuration 351 during the SN request procedure 310. This can occur if the SN 304 rejects the SN request message 316 or if the SN 304 is unable to provide the SCG configuration 351.

At 505, the MN 302 sends the resource control state and multi-node connectivity message 326 with the connection resume IE 341 and the multi-node connectivity release indicator 352 to the UE 110. As described above with respect to FIG. 4, the connection resume IE 341 directs the UE 110 to transition from the inactive state to the connected state. By including the multi-node connectivity release indicator 352, which is a form of the multi-node connectivity information 350 of FIG. 3, the MN 302 directs the UE 110 to release the one or more SCG configurations that are stored by the UE 110. In this manner, the connection with multi-node connectivity is released, and the UE 110 connects without multi-node connectivity to the MN 302, as shown at 510. In this case, execution of the SN request procedure 310 and transmission of the resource control state and multi-node connectivity message 326 enable a single-node connection to be established between the UE 110 and the MN 302 and enable the multi-node connection established at 305 between the UE 110, the MN 302, and the SN 304 to be released.

Figure 6:
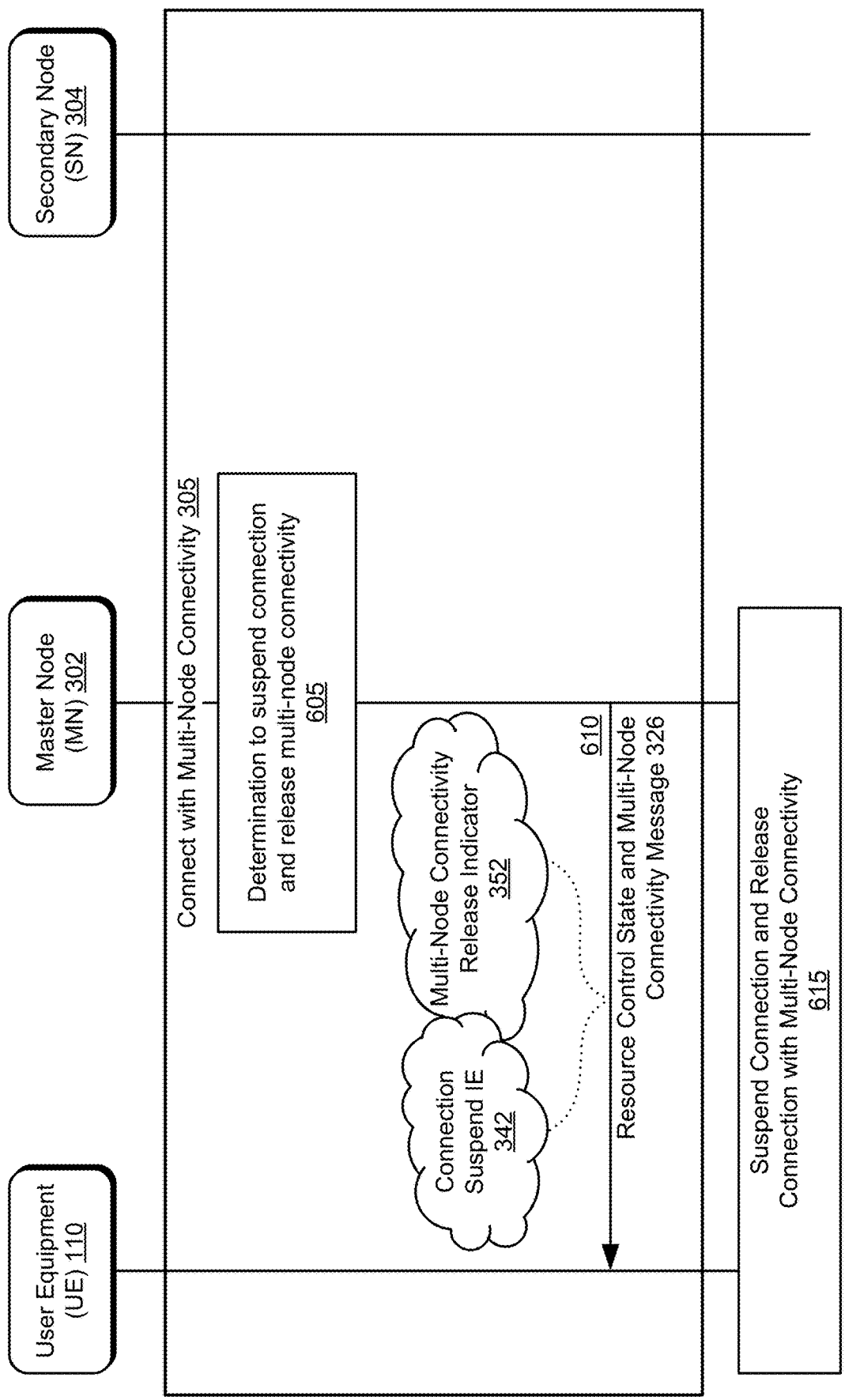
FIG. 6 illustrates details of other example data and control transactions between entities for efficient handling of a resource control state change and multi-node connectivity to release a connection with multi-node connectivity.

FIG. 6 illustrates details of other example data and control transactions between entities for efficient handling of a resource control state change and multi-node connectivity to release a connection with multi-node connectivity. At 605, the MN 302 decides to suspend the connection with the UE 110 and release the connection with multi-node connectivity. Because the MN 302 decides to release the connection with multi-node connectivity, the MN 302 can decide to not execute the SN request procedure 310 of FIG. 3.

At 610, the MN 302 sends the resource control state and multi-node connectivity message 326 with the multi-node connectivity release indicator 352 and a connection suspend IE 606. In this example scenario, the multi-node connectivity release indicator 352 and the connection suspend IE 606 are forms of the multi-node connectivity information 350 and the state change information 340 of FIG. 3, respectively. Similar to FIG. 5, the multi-node connectivity release indicator directs the UE 110 to release the SCG configurations associated with the multi-node connectivity at 305. By including the connection suspend IE 606, the MN 302 also directs the UE 110 to transition from the connected state to the inactive state.

At 615, the connection with the MN 302 is suspended and the connection with multi-node connectivity is released. In general, transmission of the resource control state and multi-node connectivity message 326 enables the multi-node connection between the UE 110, the MN 302, and the SN 304 at 305 to be released. The UE 110 can continue to be in the inactive state until the connection resume procedure is performed.

Figure 7:
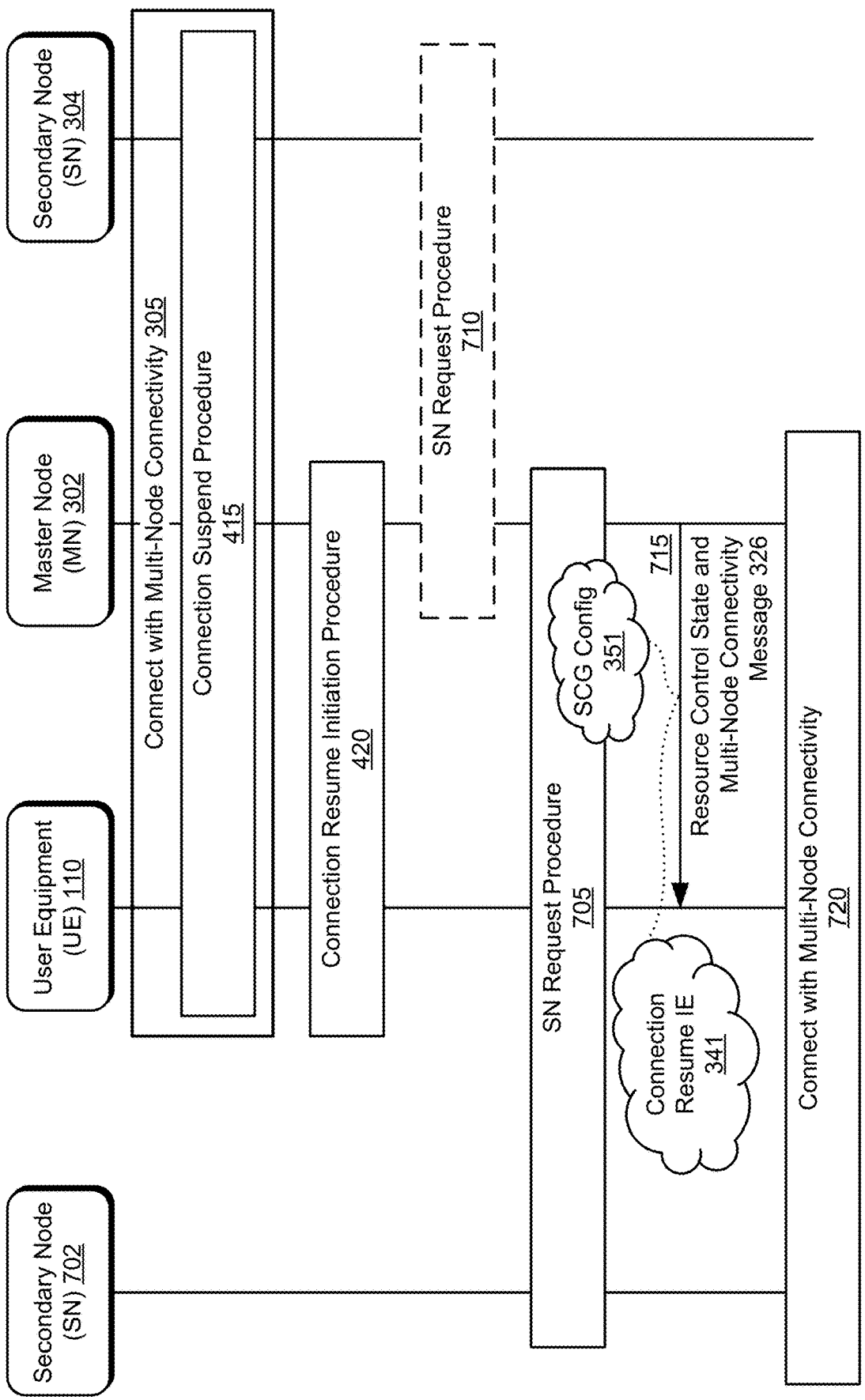
FIG. 7 illustrates details of example data and control transactions between entities for efficient handling of a resource control state change and multi-node connectivity to connect with multi-node connectivity to a different SN.

FIG. 7 illustrates details of example data and control transactions between entities for efficient handling of a resource control state change and multi-node connectivity to connect with multi-node connectivity to a different SN. In this example, the MN 302 determines to establish multi-node connectivity with an SN 702 instead of the SN 304, which was previously used for the connection with multi-node connectivity at 305. With the techniques described below, the MN 302 can switch from supporting multi-node connectivity with the SN 304 to supporting multi-node connectivity with the SN 702. In some instances, this can occur if the UE 110 moves to a different location that has coverage with the SN 702 and does not have coverage with the SN 304 while the UE 110 is in the inactive state.

At 305, the connection with multi-node connectivity is active. Although not explicitly shown, the SN 304 can provide the MN 302 the SCG configuration 351 by the activity notification message 406 or the SN modification procedure 410 as shown in FIG. 4. In this example, the connection suspend procedure 415 and the connection resume initiation procedure 420 are performed, as described above with respect to FIG. 4. In different situations, the MN 302 can perform an SN request procedure 705 with the SN 702 and/or an SN request procedure 710 with the SN 304. In general, the SN request procedures 705 and 710 are similar to the SN request procedure 310 described in FIG. 3.

During the SN request procedure 705 with the SN 702, the MN 302 can send the SN request message 316 with or without the stored SCG configuration 318, and the SN 702 can send the SN response message 322 with the SCG configuration 351. As described above, the SCG configuration 351 can be a delta SCG configuration based on the stored SCG configuration 318 or a full SCG configuration.

In situations in which the MN 302 does not have the stored SCG configuration 318, the MN 302 can execute the SN request procedure 710 with the SN 304 to request that the SN 304 provide an SCG configuration, such as a current stored SCG configuration of the UE 110. If the SN 304 responds with an SCG configuration, the MN 302 can add a new stored SCG configuration 318 or update the stored SCG configuration 318 based on this SCG configuration. The MN 302 can also include the stored SCG configuration 318 in the SN request message 316 of the SN request procedure 705. Alternatively, if the SN 304 does not respond with the SCG configuration or includes a rejection element in the SN response message 322 during the SN request procedure 710, the MN 302 can send the SN request message 316 of the SN request procedure 705 without the stored SCG configuration 318 as previously described.

At 715, the MN 302 sends the resource control state and multi-node connectivity message 326 with the connection resume IE 341 and with the SCG configuration 351 provided during the SN request procedure 705. Using the SCG configuration 351, the UE 110 connects with multi-node connectivity to the MN 302 and the SN 702, as shown at 720. In general, execution of the SN request procedure 705 and transmission of the resource control state and multi-node connectivity message 326 enable a multi-node connection to be established between the UE 110, the MN 302, and the SN 702.

FIG. 8 illustrates details of example data and control transactions between entities for efficient handling of a resource control state change and multi-node connectivity to connect without multi-node connectivity to a different MN. In this example, the UE 110 determines to connect with a MN 802 instead of the MN 302, which was previously used for multi-node connectivity at 305. The MN 802 can be selected by the UE 110 during a cell-reselection procedure, which can occur while the UE 110 is in the inactive state. With the techniques described below, the UE 110 can connect to the MN 802 without multi-node connectivity for situations in which the MN 802 is unable to connect to the SN 304 because the MN 802 does not have a connection interface with the SN 304.

At 305, the connection with multi-node connectivity is active. Although not explicitly shown, the SN 304 can provide the MN 302 the SCG configuration 402 by the activity notification message 406 or the SN modification procedure 410 similar to that shown in FIG. 4. In this example, the connection suspend procedure 415 and the connection resume initiation procedure 420 are performed, as described above with respect to FIG. 4.

In this example, a UE context request procedure 805 can be performed between the MN 802 and the MN 302 in response to the connection resume initiation procedure 420 or as part of the connection resume procedure. During the UE context request procedure 805, the MN 802 can send a UE context request message 812 to the MN 302, as shown at 810. In general, the UE context request message 812 directs the MN 302 to provide one or more configurations used for multi-node connectivity at 305.

At 815, the MN 302 can send a UE context response message 816 to the MN 802. The UE context response message 816 can include one or more MCG configurations or one or more SCG configurations associated with the connection at 305. In some situations, the UE context request message 812 can direct the MN 302 and the SN 304 to perform the SN request procedure 310. The SN request procedure 310 in FIG. 8 enables the MN 302 to request that the SN 304 provide an SCG configuration, such as a stored SCG configuration of the UE 110. If the SN 304 responds with an SCG configuration, the MN 302 can add a new stored SCG configuration 318 or update the stored SCG configuration 318 based on this SCG configuration. The MN 302 can also include the stored SCG configuration 318 in the UE context response message 816. Alternatively if the SN 304 does not respond with the SCG configuration or includes a rejection element in the SN response message 322 during the SN request procedure 310, the MN 302 can send the UE context response message 816 without the stored SCG configuration 318 as previously described.

If the SCG configuration is not provided by the SN 304 to the MN 302 during the SN request procedure 310, the MN 302 can include an indicator in the UE context response message 816 to inform the MN 802 of the UE's previous connection with multi-node connectivity at 305. This indicator can direct the MN 802 to determine whether or not it can support multi-node connectivity with the SN 304. In this example, the MN 802 determines to release the connection with multi-node connectivity because it is unable to support multi-node connectivity with the SN 304.

At 820, the MN 802 sends the resource control state and multi-node connectivity message 326 to the UE 110. Similar to FIG. 5, the resource control state and multi-node connectivity message 326 of FIG. 8 includes the multi-node connectivity release indicator 352 to direct the UE 110 to release the SCG configuration and includes the connection resume IE 341 to enable the UE 110 to connect with the MN 802.

At 825, the UE 110 connects without multi-node connectivity to the MN 802. In this case, execution of the UE context request procedure 805 and transmission of the resource control state and multi-node connectivity message 326 enable a single-node connection to be established between the UE 110 and the MN 802 and enable the multi-node connection established at 305 between the UE 110, the MN 302, and the SN 304 to be released.

FIG. 9 illustrates details of example data and control transactions between entities for efficient handling of a resource control state change and multi-node connectivity to connect with multi-node connectivity to a different MN and a different SN. Similar to FIG. 8, the UE 110 determines to connect with the MN 802 instead of the MN 302, which was previously used for multi-node connectivity at 305. With the techniques described below, however, the UE 110 connects with multi-node connectivity to the SN 702 in FIG. 9 instead of the SN 304 (as shown in FIG. 8). In this example, the MN 802 is unable to support multi-node connectivity with the SN 304, but can support multi-node connectivity with the SN 702. As such, the MN 802 establishes multi-node connectivity with the SN 702 instead of releasing the multi-node connectivity, as described above in FIG. 8.

At 305, the UE 110 connects with multi-node connectivity to the MN 302 and the SN 304. Although not explicitly shown, the SN 304 can provide the MN 302 the SCG configuration 351 by the activity notification message 406 or the SN modification procedure 410, as described with respect to FIG. 4. Similar to FIG. 8, the connection suspend procedure 415, the connection resume initiation procedure 420, the UE context request procedure 805, and optionally the SN request procedure 310 can be performed, as described above with respect to FIG. 8.

To establish multi-node connectivity with the SN 702, an SN request procedure 905 is performed after the UE context request procedure 805. Generally, the SN request procedure 905 is similar to the SN request procedure 310 described above in FIG. 3. In this case, the SN request procedure 905 provides the SCG configuration 351 to the MN 802. In some situations, the SCG configuration 351 can include a delta SCG configuration based on the stored SCG configuration 318 provided by the UE context request procedure 805. In other situations, the SCG configuration 351 can include a full SCG configuration.

At 910, the MN 802 sends the resource control state and multi-node connectivity message 326 with the SCG configuration 351 and the connection resume IE 341 to the UE 110. With the SCG configuration 351 and the connection resume IE 341, the UE 110 connects with multi-node connectivity to the MN 802 and the SN 702, as shown at 915. In general, execution of the SN request procedure 905 and transmission of the resource control state and multi-node connectivity message 326 enable a multi-node connection to be established between the UE 110, the MN 802, and the SN 702.

Example Method

Figure 10:
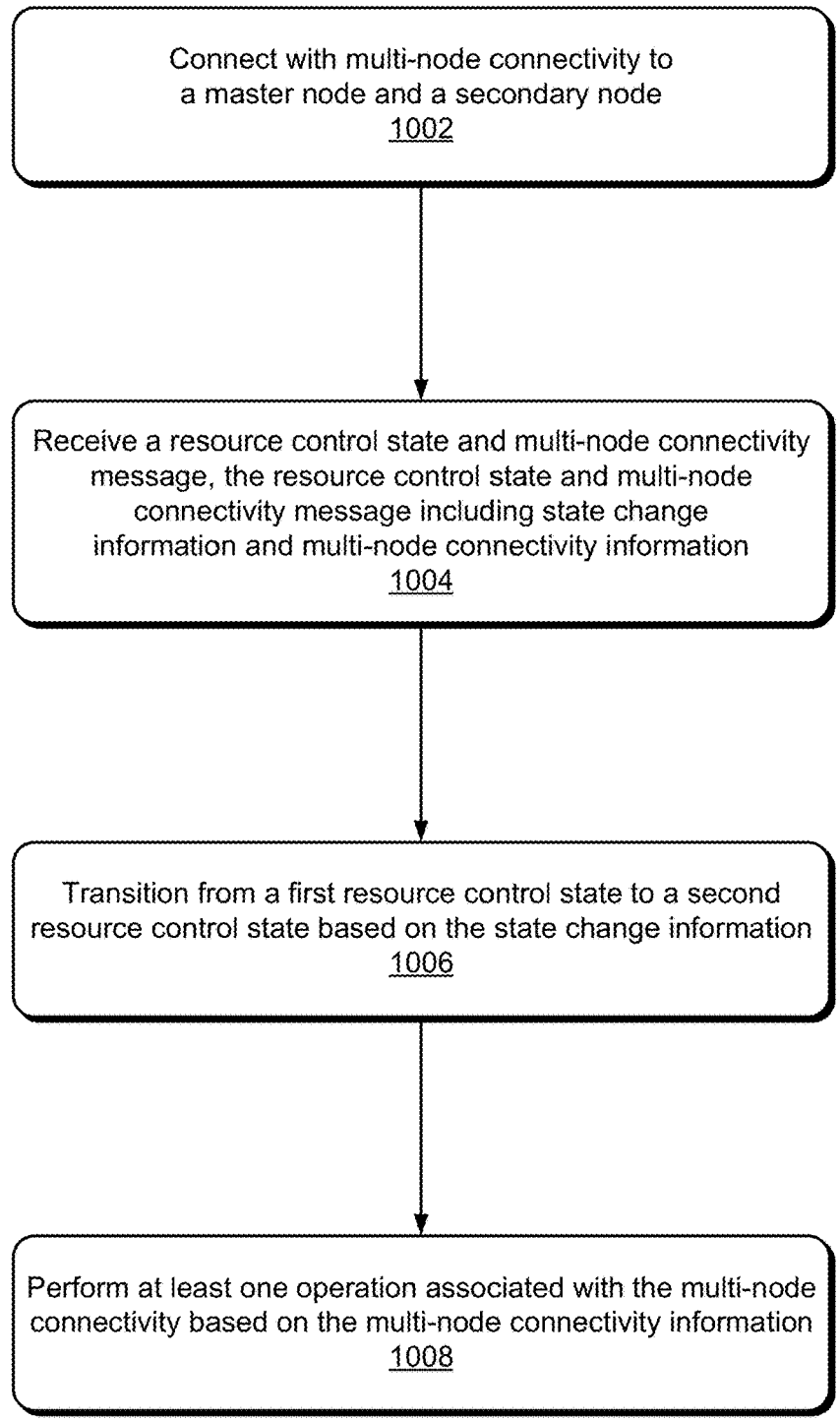
FIG. 10 illustrates an example method for efficient handling of a resource control state change and multi-node connectivity.

FIG. 10 depicts an example method 1000 for efficient handling of a resource control state change and multi-node connectivity. Method 1000 is shown as a set of operations (or acts) performed but not necessarily limited to the order or combinations in which the operations are illustrated. Further, any of one or more of the operations may be repeated, combined, reorganized, or linked to provide a wide array of additional and/or alternative methods. In portions of the following discussion, reference may be made to environment 100 of FIG. 1 and entities detailed in FIGS. 2-9, reference to which is made for example only. The techniques are not limited to performance by one entity or multiple entities operating on one device.

At 1002, multi-node connectivity to a master node and a secondary node occurs. For example, the UE 110 can connect with multi-node connectivity to the MN 302 and the SN 304. While the multi-node connectivity is active, the MN 302 can receive the SCG configuration 351 from the SN 304 by the activity notification message 406 or by the SN modification procedure 410, as shown in FIG. 4. In some cases, the UE 110, the MN 302, and the SN 304 can perform the connection suspend procedure 415 of FIG. 4.

At 1004, a resource control state and multi-node connectivity message is received. The resource control state and multi-node connectivity message includes state change information and multi-node connectivity information. For example, the UE 110 can receive the resource control state and multi-node connectivity message 326. As shown in FIG. 3, the resource control state and multi-node connectivity message 326 can include at least one SCG configuration 351 or the multi-node connectivity release indicator 352. In some cases, the multi-node connectivity information 350 can also include the MCG configuration 353. In different situations, the resource control state and multi-node connectivity message 326 can be received from a MN that the UE previously connected to with multi-node connectivity (e.g., the MN 302) or from a different MN that the UE selected (e.g., the MN 802).

At 1006, a transition occurs from a first resource control state to a second resource control state based on the state change information of the resource control state and multi-node connectivity message. For example, the UE 110 can transition from the inactive state to the connected state based on the connection resume IE 341 of FIG. 4, which is a form of the state change information 340 shown in FIG. 3. As another example, the UE 110 can transition from the connected state to the inactive state based on the connection suspend IE 606 of FIG. 6, which is another form of the state change information 340 shown in FIG. 3.

At 1008, at least one operation associated with the multi-node connectivity is performed based on the multi-node connectivity information. For example, the UE 110 modifies a previously-stored secondary cell group configuration based on the at least one SCG configuration 351. Additionally or alternatively, the UE 110 reconnects with multi-node connectivity using the SCG configuration 351 (shown in FIG. 4), connects without multi-node connectivity based on the multi-node connectivity release indicator 352 (shown in FIGS. 5 and 8), releases a connection with multi-node connectivity (shown in FIG. 6), connect with multi-node connectivity to a different SN (shown in FIG. 7), or connects with multi-node connectivity to a different MN and a different SN (shown in FIG. 9).

CONCLUSION

Although techniques for efficient handling of a resource control state change and multi-node connectivity have been described in language specific to features and/or methods, it is to be understood that the subject of the appended claims is not necessarily limited to the specific features or methods described. Rather, the specific features and methods are disclosed as example implementations of efficient handling of a resource control state change and multi-node connectivity.

In the following some examples are described.

Example 1: A method performed by a base station, the method comprising:
  operating as a master node for multi-node connectivity with a user equipment and a secondary node; and
  sending a resource control state and multi-node connectivity message to the user equipment, the resource control state and multi-node connectivity message including:
    state change information to direct the user equipment to transition from a first resource control state to a second resource control state; and
    multi-node connectivity information to direct the user equipment to perform an operation associated with the multi-node connectivity.

Example 2: The method of example 1, further comprising:
  suspending, prior to sending the resource control state and multi-node connectivity message, a connection associated with the multi-node connectivity and directing the user equipment to transition from a connected state to an inactive state, wherein:
  the first resource control state comprises the inactive state;
  the second resource control state comprises the connected state; and
  the state change information includes a connection resume information element to direct the user equipment to transition from the inactive state to the connected state.

Example 3: The method of example 2, further comprising:
  receiving at least one secondary cell group configuration from the secondary node, wherein:
  the multi-node connectivity information includes the at least one secondary cell group configuration to direct the user equipment to reconnect with the multi-node connectivity to the master node and the secondary node.

Example 4: The method of example 3, further comprising:
  sending, to the secondary node, a secondary node request message to direct the secondary node to provide the at least one secondary cell group configuration,
  wherein receiving the at least one secondary cell group configuration comprises receiving a secondary node response message that includes the at least one secondary cell group configuration.

Example 5: The method of example 3 or 4, wherein the at least one secondary cell group configuration comprises at least one full secondary cell group configuration.

Example 6: The method of example 4, further comprising:
  storing another secondary cell group configuration associated with the secondary node,
  wherein the secondary node request message includes the other secondary cell group configuration to direct the secondary node to send at least one delta secondary cell group configuration as the at least one secondary cell group configuration, the at least one delta secondary cell group configuration based on the other secondary cell group configuration.

Example 7: The method of example 5, further comprising:
  receiving, from the secondary node, an activity notification message that includes the other secondary cell group configuration.

Example 8: The method of example 6, further comprising:
  performing a secondary node modification procedure with the secondary node to direct the secondary node to send the other secondary cell group configuration to the base station.

Example 9: The method of example 1 or 2, further comprising:
  sending, to another secondary node, a secondary node request message to direct the other secondary node to provide at least one secondary cell group configuration; and
  receiving, from the other secondary node, a secondary node response message with the at least one secondary cell group configuration,
  wherein the multi-node connectivity information includes the at least one secondary cell group configuration to direct the user equipment to connect with the multi-node connectivity to the master node and the other secondary node.

Example 10: The method of example 1 or 2, wherein:
  the multi-node connectivity information includes a multi-node connectivity release indicator to direct the user equipment to connect without the multi-node connectivity to the master node.

Example 11: The method of example 1, wherein:
  the first resource control state comprises a connected state;
  the second resource control state comprises an inactive state;
  the state change information includes a connection suspend information element to direct the user equipment to transition from the connected state to the inactive state; and
  the multi-node connectivity information includes a multi-node connectivity release indicator to direct the user equipment to release a connection associated with the multi-node connectivity.

Example 12: A base station comprising:
  a radio-frequency transceiver; and
  a processor and memory system configured to perform the method of any of examples 1-11.

Example 13: A method performed by a user equipment, the method comprising:
  connecting with multi-node connectivity to a master node and a secondary node;
  receiving a resource control state and multi-node connectivity message, the resource control state and multi-node connectivity message including state change information and multi-node connectivity information;
  transitioning from a first resource control state to a second resource control state based on the state change information; and
  performing an operation associated with the multi-node connectivity based on the multi-node connectivity information.

Example 14: The method of example 13, further comprising:
  prior to receiving the resource control state and multi-node connectivity message, transitioning from a connected state to an inactive state, wherein:
  the state change information includes a connection resume information element;

the first resource control state comprises the inactive state based on the connection resume information element; and the second resource control state comprises the connected state based on the connection resume information element.

Example 15: The method of example 13 or 14, wherein:
the multi-node connectivity information includes at least one secondary cell group configuration; and
the performing of the operation comprises reconnecting with the multi-node connectivity to the master node and the secondary node based on the at least one secondary cell group configuration.

Example 16: The method of example 15, wherein:
the at least one secondary cell group configuration comprises a random access configuration,
the method further comprising:
performing a random access procedure with the secondary node based on the random access configuration.

Example 17: The method of example 15, wherein:
the at least one secondary cell group configuration comprises at least one full secondary cell group configuration,
the method further comprising:
storing at least one full secondary cell group configuration; or
replacing a previously-stored secondary cell group configuration with the at least one full secondary cell group configuration.

Example 18: The method of example 15, wherein:
the at least one secondary cell group configuration comprises at least one delta secondary cell group configuration,
the method further comprising:
modifying a previously-stored secondary cell group configuration based on the delta secondary cell group configuration.

Example 19: The method of example 13 or 14, wherein:
the multi-node connectivity information includes a multi-node connectivity release indicator; and
the performing of the operation comprises:
releasing a connection associated with the multi-node connectivity based on the multi-node connectivity release indicator; and
connecting without multi-node connectivity to the master node.

Example 20: The method of example 13 or 14, further comprising:
sending, to a second master node, a connection resume request message, wherein:
the receiving of the resource control state and multi-node connectivity message comprises receiving the resource control state and multi-node connectivity message from the second master node;
the multi-node connectivity information includes at least one secondary cell group configuration associated with the secondary node; and
the performing of the operation comprises connecting with the multi-node connectivity to the second master node and the secondary node based on the at least one secondary cell group configuration.

Example 21: The method of example 13 or 14, further comprising:
sending, to a second master node, a connection resume request message, wherein:
the receiving of the resource control state and multi-node connectivity message comprises receiving the resource control state and multi-node connectivity message from the second master node;
the multi-node connectivity information includes at least one secondary cell group configuration associated with another secondary node; and
the performing of the operation comprises connecting with the multi-node connectivity to the second master node and the other secondary node based on the at least one secondary cell group configuration.

Example 22: The method of example 13, wherein:
the state change information comprises a connection suspend information element;
the first resource control state comprises a connected state based on the connection suspend information element;
the second resource control state comprises an inactive state based on the connection suspend information element;
the multi-node connectivity information comprises a multi-node connectivity release indicator; and
the performing of the operation comprises releasing a connection associated with the multi-node connectivity based on the multi-node connectivity release indicator.

Example 23: A user equipment comprising:
a radio-frequency transceiver; and
a processor and memory system configured to perform the method of any of examples 12-22.

Example 24: A system comprising a base station of example 12 and a user equipment of example 23.

What is claimed is:

1. A base station comprising:
a radio-frequency transceiver;
a processor and memory system configured to direct the base station to:
operate as a master node for multi-node connectivity with a user equipment and a secondary node;
prior to sending a first resource control state and multi-node connectivity message, suspend a connection associated with the multi-node connectivity and directing the user equipment to transition from a connected state to an inactive state; and
send the first resource control state and multi-node connectivity message to the user equipment, the first resource control state and multi-node connectivity message including:
state change information to direct the user equipment to transition from the inactive state to the connected state and the state change information includes a connection resume information element to direct the user equipment to transition from the inactive state to the connected state; and
multi-node connectivity information including a full secondary cell group configuration to direct the user equipment to modify a previously-stored secondary cell group configuration based on the secondary cell group configuration.

2. The base station of claim 1, the processor and memory system configured to direct the base station to:
receive the secondary cell group configuration from the secondary node,
wherein the secondary cell group configuration directs the user equipment to reconnect with the multi-node connectivity to the master node and the secondary node.

3. The base station of claim 2, wherein:
the secondary cell group configuration directs the user equipment to replace the previously stored secondary cell group configuration with the full secondary cell group configuration.

4. The base station of claim 1, the processor and memory system configured to direct the base station to:
send, to another secondary node, a secondary node request message to direct the other secondary node to provide the secondary cell group configuration; and
receive, from the other secondary node, a secondary node response message with the secondary cell group configuration,
wherein the secondary cell group configuration directs the user equipment to connect with the multi-node connectivity to the master node and the other secondary node.

5. The base station of claim 1, the processor and memory system further configured to direct the base station to:
send a second resource control state and multi-node connectivity message to the user equipment, the second resource control state and multi-node connectivity message including:
other state change information to direct the user equipment to transition from the second resource control state to the first resource control state, the other state change information including connection suspend information; and
other multi-node connectivity information including a multi-node connectivity release indicator to direct the user equipment to release a connection associated with the multi-node connectivity and connect without the multi-node connectivity to the master node.

6. The base station of claim 1, wherein the secondary cell group configuration comprises a random access configuration, that directs the user equipment to perform a random access procedure with the secondary node based on the random access configuration.

7. A method performed by a user equipment, the method comprising:
connecting with multi-node connectivity to a master node and a secondary node;
receiving, from the master node, a first resource control state and multi-node connectivity message, the first resource control state and multi-node connectivity message including state change information and multi-node connectivity information, the multi-node connectivity information including at least one secondary cell group configuration;
transitioning from a first resource control state to a second resource control state based on the state change information; and
modifying a previously-stored secondary cell group configuration based on the at least one secondary cell group configuration.

8. The method of claim 7, further comprising:
prior to receiving the first resource control state and multi-node connectivity message, transitioning from a connected state to an inactive state, wherein:
the state change information includes connection resume information;
the first resource control state comprises the inactive state; and
the second resource control state comprises the connected state.

9. The method of claim 7, further comprising:
reconnecting with the multi-node connectivity to the master node and the secondary node based on the at least one secondary cell group configuration.

10. The method of claim 7, wherein:
the at least one secondary cell group configuration comprises a random access configuration,
the method further comprising:
performing a random access procedure with the secondary node based on the random access configuration.

11. The method of claim 7, wherein:
the at least one secondary cell group configuration comprises at least one full secondary cell group configuration; and
the modifying the previously-stored secondary cell group configuration comprises replacing the previously-stored secondary cell group configuration with the at least one full secondary cell group configuration.

12. The method of claim 7, wherein:
the at least one secondary cell group configuration comprises at least one delta secondary cell group configuration; and
the modifying the previously-stored secondary cell group configuration comprises modifying a portion of the previously-stored secondary cell group configuration based on the delta secondary cell group configuration.

13. The method of claim 7, further comprising:
receiving a second resource control state and multi-node connectivity message, the second resource control state and multi-node connectivity message including other state change information and other multi-node connectivity information, the other state change information comprising connection suspend information; the other multi-node connectivity information including a multi-node connectivity release indicator;
transitioning from the second resource control state to the first resource control state based on the connection suspend information; and
releasing a connection associated with the multi-node connectivity based on the multi-node connectivity release indicator; and
connecting without multi-node connectivity to the master node.

14. The method of claim 7, further comprising:
sending, to a second master node, a connection resume request message, wherein:
the receiving of the first resource control state and multi-node connectivity message comprises receiving the first resource control state and multi-node connectivity message from the second master node; and
the at least one secondary cell group configuration is associated with the secondary node or another secondary node,
the method further comprising:
connecting with the multi-node connectivity to the second master node and either the secondary node or the other secondary node based on the at least one secondary cell group configuration.

15. A user equipment comprising:
a radio-frequency transceiver; and
a processor and memory system that configure the user equipment to:
connect with multi-node connectivity to a master node and a secondary node;
receive, from the master node, a first resource control state and multi-node connectivity message, the first resource control state and multi-node connectivity message including state change information and multi-node connectivity information, the multi-node connectivity information including at least one secondary cell group configuration;

transition from a first resource control state to a second resource control state based on the state change information; and modify a previously-stored secondary cell group configuration based on the at least one secondary cell group configuration.

16. The user equipment of claim 15, the processor and memory system further configure the user equipment to:

prior to reception of the first resource control state and multi-node connectivity message, transition from a connected state to an inactive state, wherein:

the state change information includes connection resume information;

the first resource control state comprises the inactive state; and the second resource control state comprises the connected state.

17. The user equipment of claim 15, the processor and memory system further configure the user equipment to:

reconnect with the multi-node connectivity to the master node and the secondary node based on the at least one secondary cell group configuration.

18. The user equipment of claim 15, wherein:

the at least one secondary cell group configuration comprises a random access configuration, the processor and memory system further configure the user equipment to:

perform a random access procedure with the secondary node based on the random access configuration.

19. The user equipment of claim 15, wherein:

the at least one secondary cell group configuration comprises at least one full secondary cell group configuration; and the modification of the previously-stored secondary cell group configuration comprises replacing the previously-stored secondary cell group configuration with the at least one full secondary cell group configuration.

20. The user equipment of claim 15, wherein:

the at least one secondary cell group configuration comprises at least one delta secondary cell group configuration; and the modification of the previously-stored secondary cell group configuration comprises modifying a portion of the previously-stored secondary cell group configuration based on the delta secondary cell group configuration.

* * * * *